United States Patent [19]

Hiratsuka et al.

[11] Patent Number: 4,841,337

[45] Date of Patent: Jun. 20, 1989

[54] IMAGE FORMING APPARATUS

[75] Inventors: Seiichiro Hiratsuka; Kunihisa Yoshino; Satoshi Haneda; Hisashi Shoji, all of Tokyo, Japan

[73] Assignee: Konica Corporation, Tokyo, Japan

[21] Appl. No.: 183,711

[22] Filed: Apr. 19, 1988

[30] Foreign Application Priority Data

Apr. 21, 1987 [JP] Japan .................................. 62-99534

[51] Int. Cl.[4] ............................................ G03G 15/01
[52] U.S. Cl. .................................... 355/157; 355/326; 355/246; 355/229; 346/107 R; 346/153.1
[58] Field of Search .................. 355/4, 14 R, 3 R, 38, 355/69, 77, 88; 346/107 R, 108, 153.1, 76 L, 157

[56] References Cited

U.S. PATENT DOCUMENTS

| | | | |
|---|---|---|---|
| 3,799,668 | 3/1974 | McVeigh | 355/4 |
| 4,068,940 | 1/1978 | Bobbe | 355/4 |
| 4,159,174 | 6/1979 | Rising | 355/38 |
| 4,385,823 | 5/1983 | Kasper et al. | 355/3 R |
| 4,577,954 | 3/1986 | Kajiwara | 355/4 |
| 4,615,607 | 10/1986 | Yanagawa et al. | 355/4 X |
| 4,734,735 | 3/1988 | Haneda | 355/4 |
| 4,809,037 | 2/1989 | Sato | 355/4 |

Primary Examiner—A. C. Prescott
Attorney, Agent, or Firm—Jordan B. Bierman

[57] ABSTRACT

A color image forming apparatus wherein a latent image is formed on an image retainer based on an image data obtained by processing a color-separated image of a document, and developed by a plurality of developing devices having therein toners each different in color, one of the plural developing devices being selected corresponding to a specific color of the document, and the developing step being repeated plural times, so that a multi-color toner image is formed on the image retainer.

10 Claims, 15 Drawing Sheets

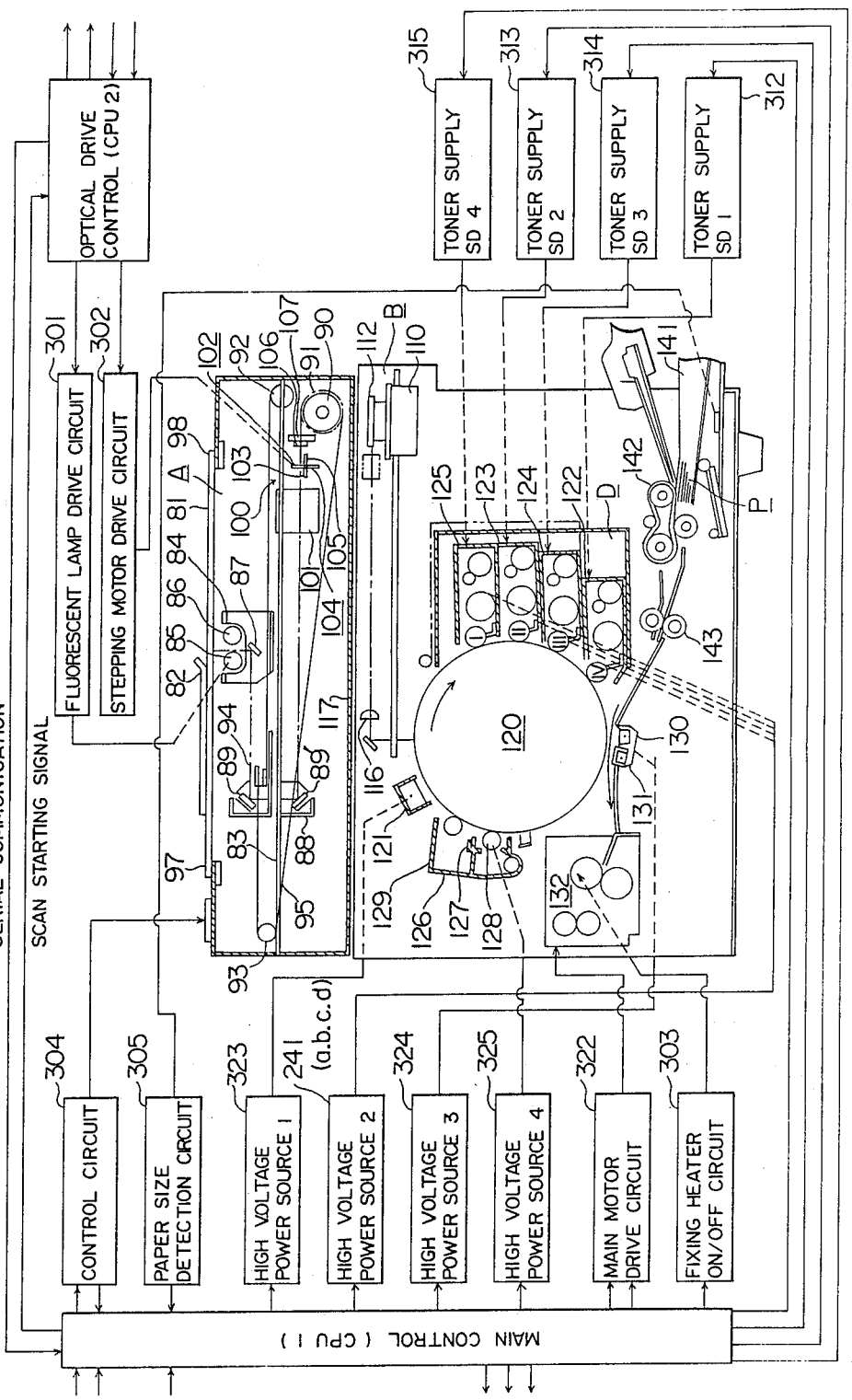
F I G. 1

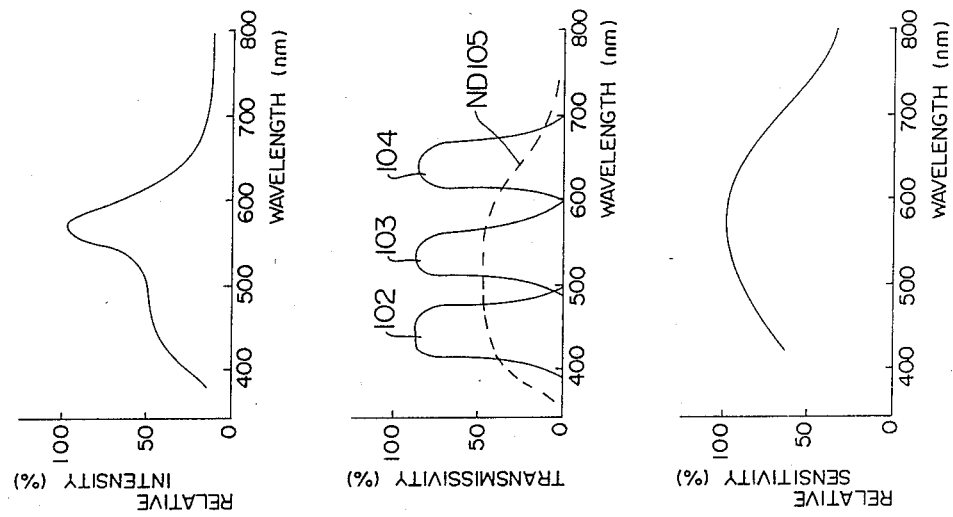

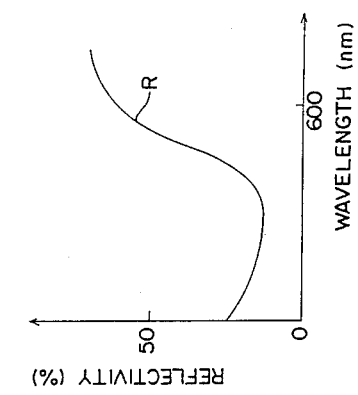
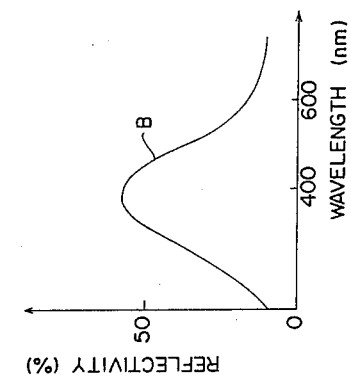
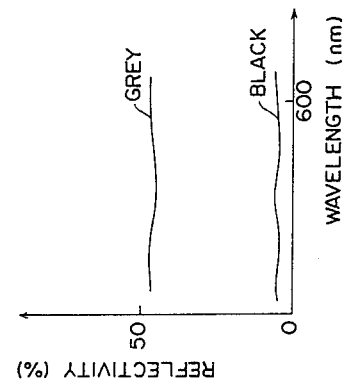
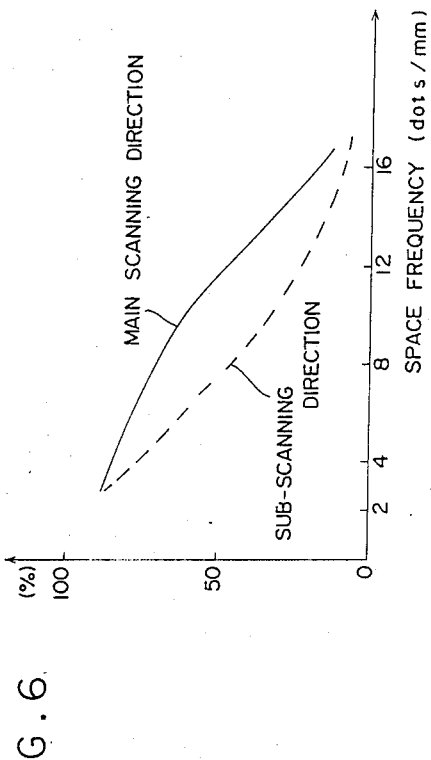

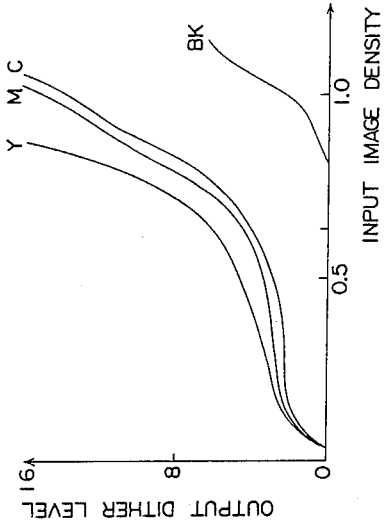
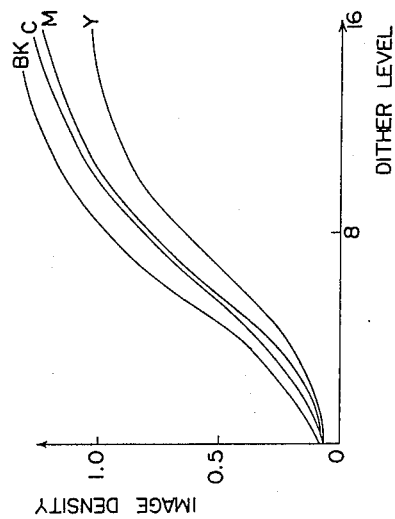

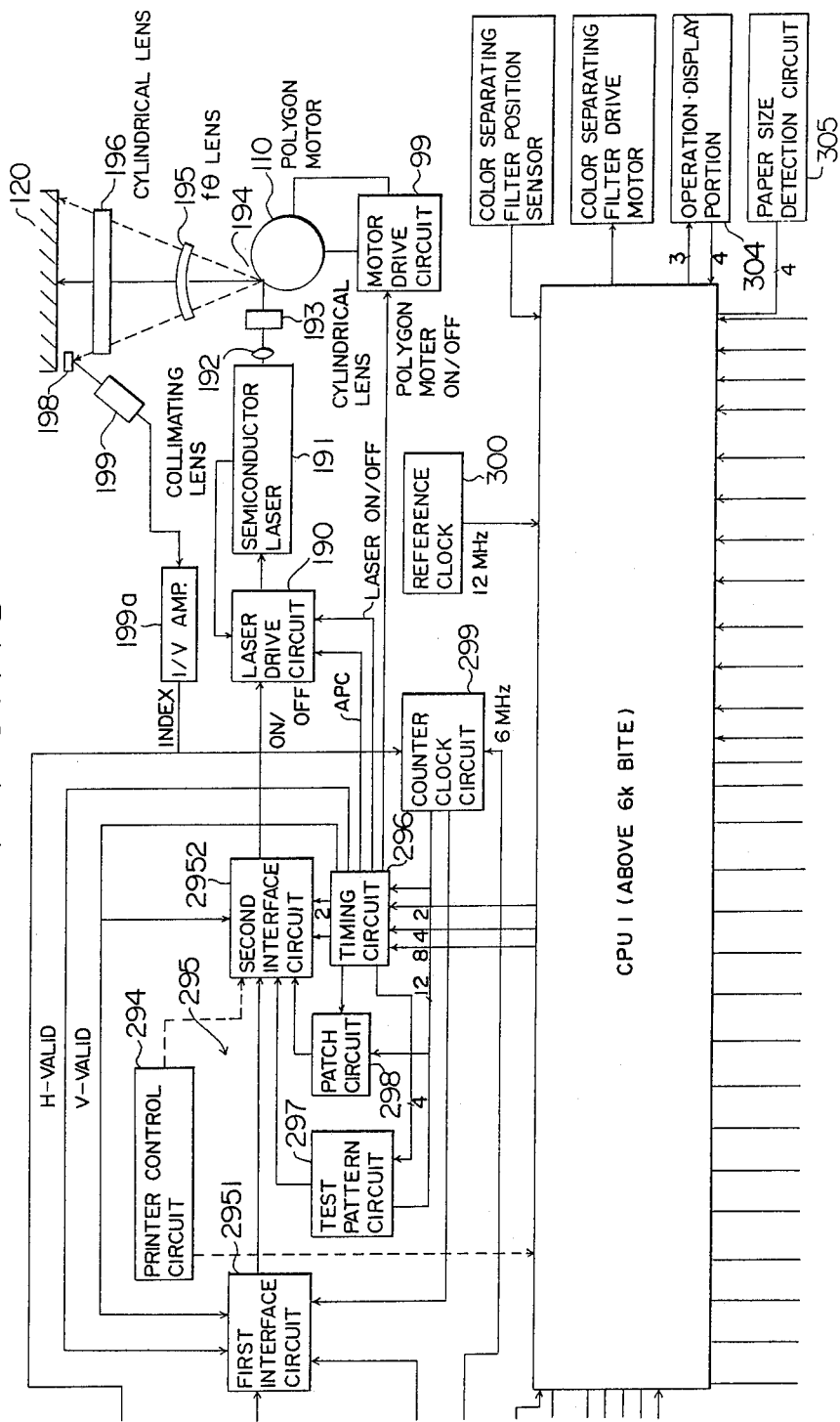

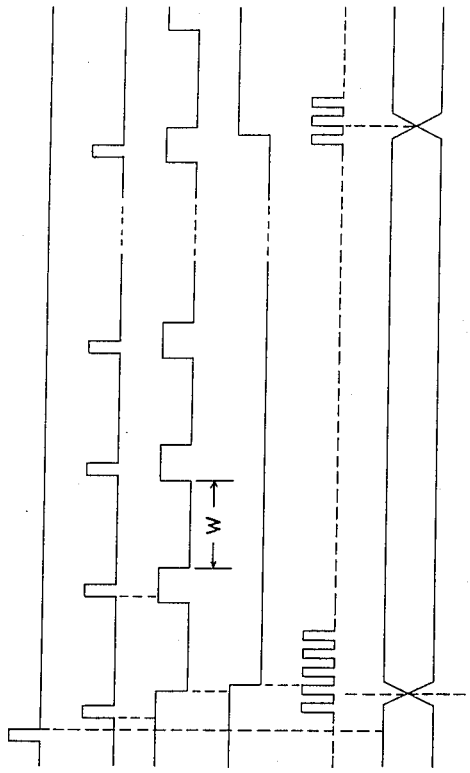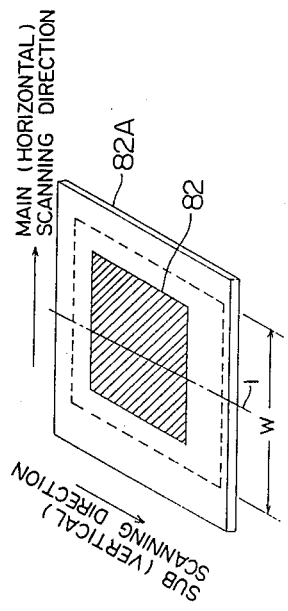
FIG. 15A  DOCUMENT READ START
FIG. 15B  HORIZONTAL SYNCHRONOUS SIGNAL H-SYNC
FIG. 15C  HORIZONTAL VALID RANGE SIGNAL H-VALID
FIG. 15D  VERTICAL VALID RANGE SIGNAL V-VALID
FIG. 15E  SYNCHRONOUS CLOCK CLK
FIG. 15F  IMAGE SIGNAL
FIG. 16

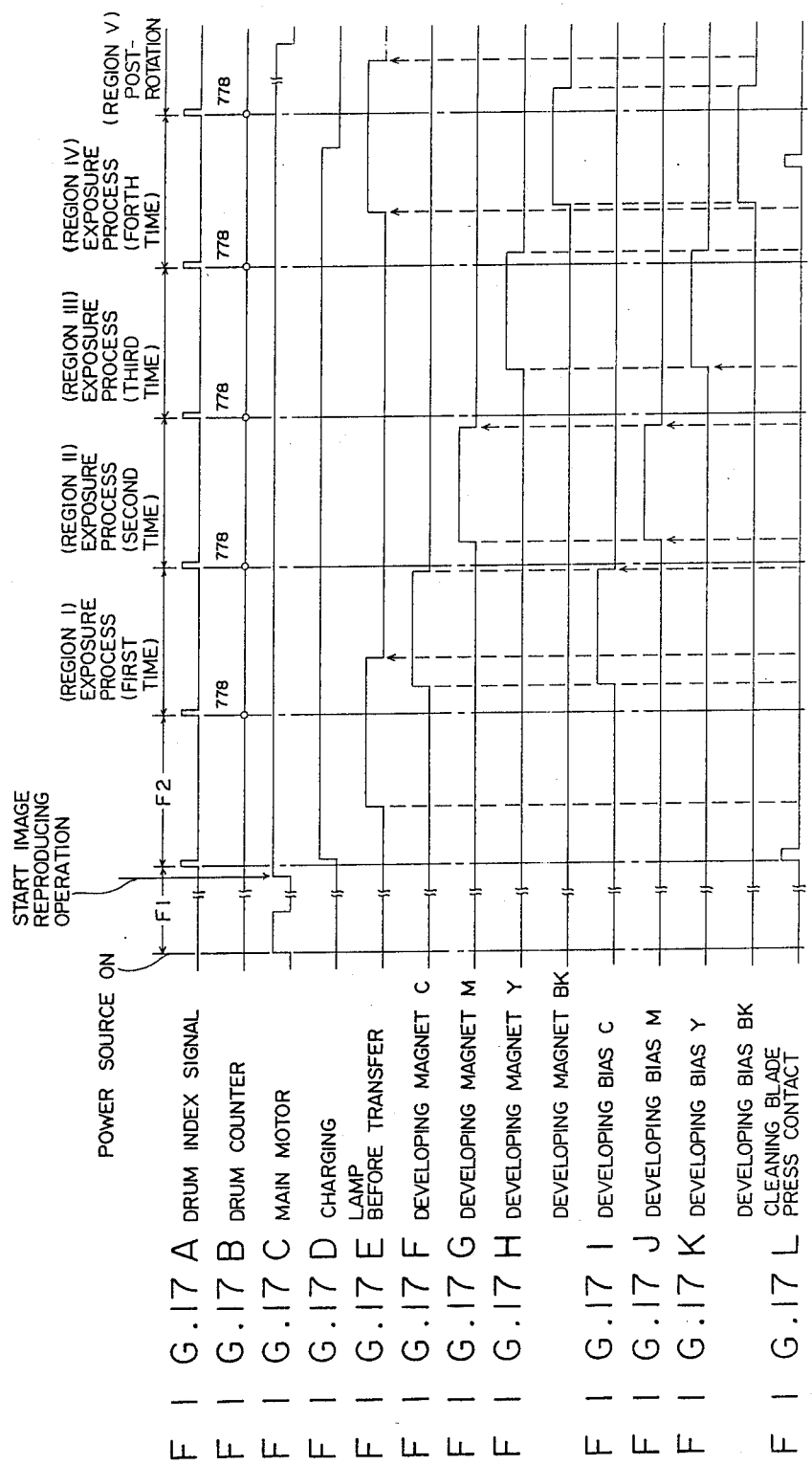

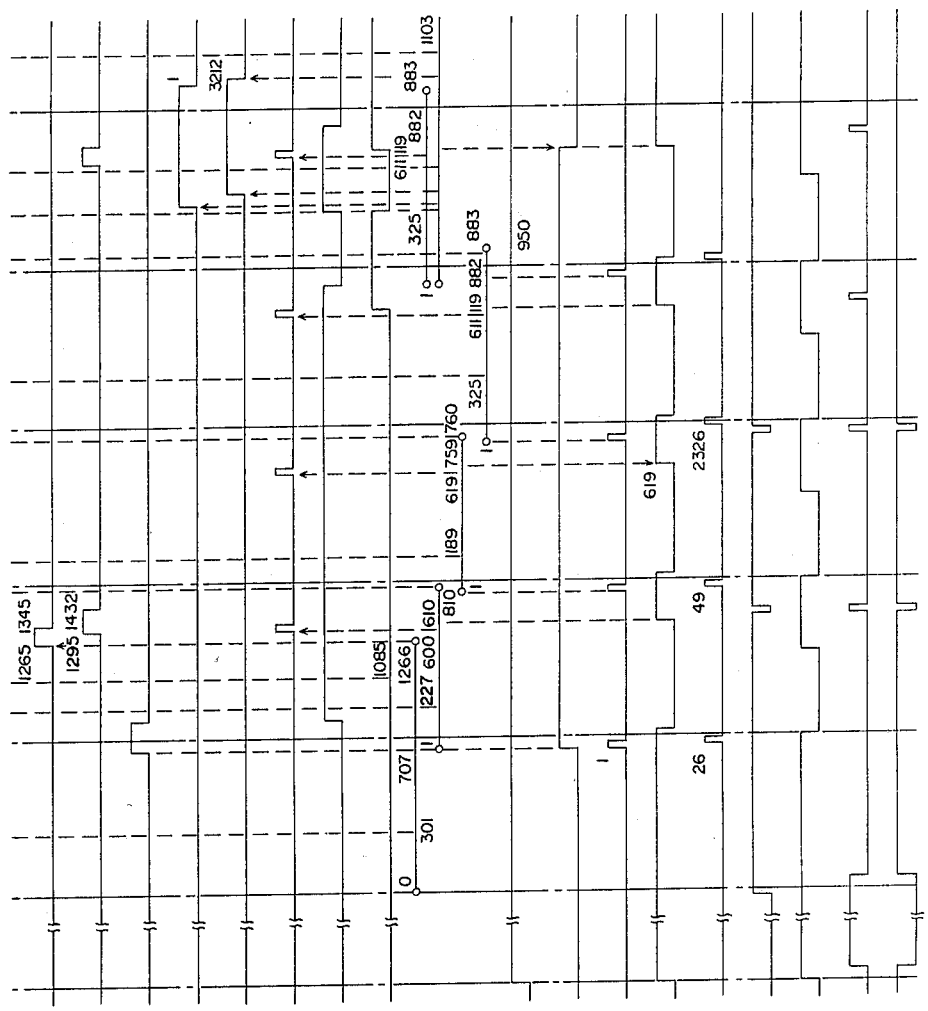

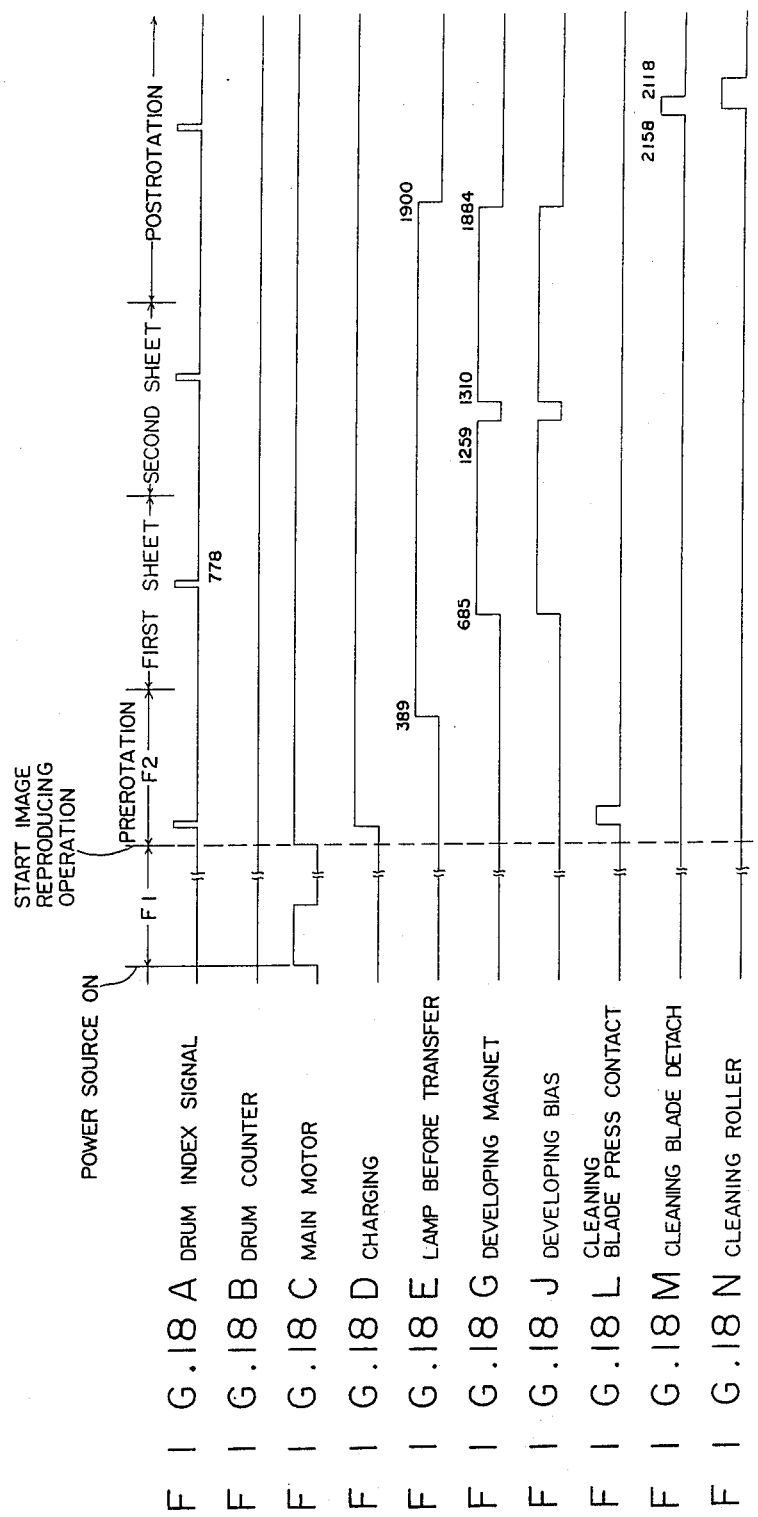

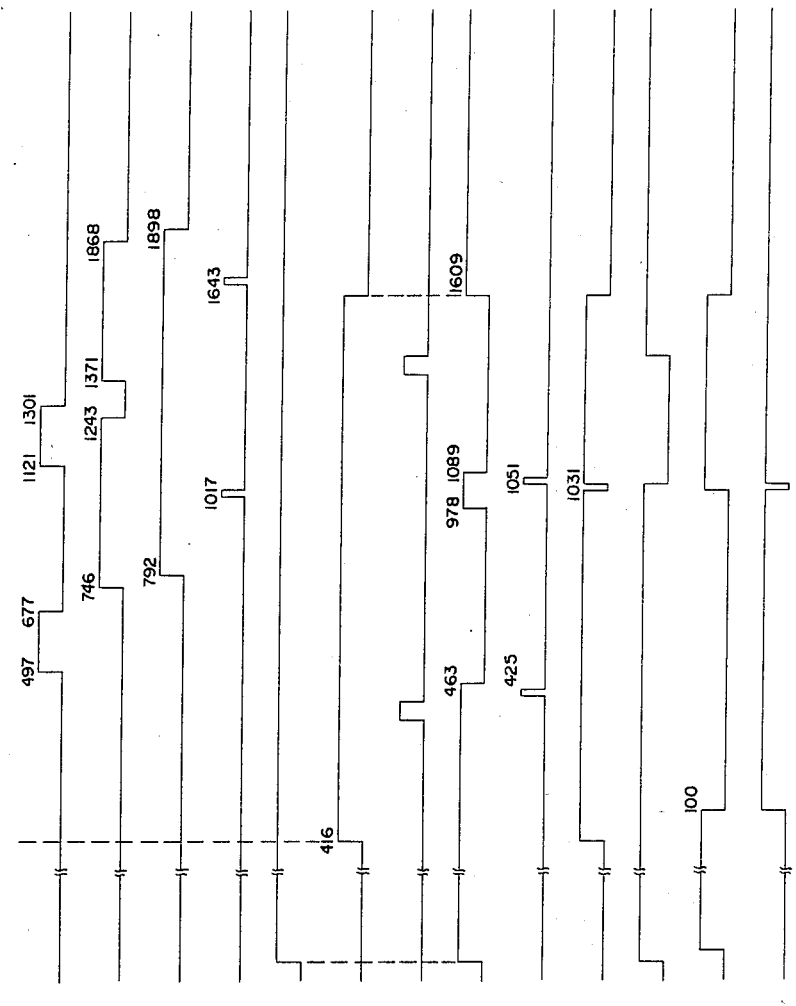

IMAGE FORMING APPARATUS

BACKGROUND OF THE INVENTION

1. Field of the Invention

The present invention relates to a color image forming apparatus and, more particularly, to a color image forming apparatus for forming a color image by a digital system.

2. Description of the Prior Art

Demands for color copies bearing much information are recently increasing in accordance with the wide spread of the color image devices of computer color CRT display systems or videotex terminal system and the coloration of documents and printed matters in firms and offices.

From this background, a variety of methods and apparatus for forming multi-color images have been proposed.

In Japanese Patent Laid-Open Nos. 52-106743, 56-144452, 58-79261 and 61-170754, for example, there is disclosed a method by which a plurality of latent image forming means and developing means are arranged around a rotating drum-shaped photosensitive member so that visible images of different colors are overlapped on the drum-shaped photosensitive member by repeating the latent image formations and developments and are transferred altogether to a recording paper.

The resists of the toner images on an image retainer using a plurality of image pickup elements according to the above-specified system are far better improved than those of the color reproducing system using a transfer drum according to the prior art but are still troubled by serious problems such as the color drifts or Moiré due to the color image pickup elements.

These problems are caused by the fact that dislocations of pixels are unavoidable in a color contact sensor type or a reduced focal type of prism separation.

In the former type, color correction is accomplished from information having a dislocation of one third pixel because B, G and R filters are disposed alternately. In the latter type, three CCDs have to be positioned in an accuracy of about 0.2 pixels (wherein one pixel is about 10 microns), which is considerably difficult. Another problem of chromatic aberration also arises. Because of the requirement for the B, G and R information, moreover, it is difficult to speed up the CCD drive, and the processing of images and the provision of sensors raise the cost.

In Japanese Patent Laid-Open Nos. 60-76766, 60-95456 and 61-170754, on the other hand, there is also disclosed a method by which one latent image forming means and a plurality of developing means are arranged around a rotating drum-shaped photosensitive member so that a latent image of one color is formed and developed for each rotation of the photosensitive member and so that a multi-color visible image is formed on the photosensitive member by a plurality of rotations of the photosensitive member and are transferred altogether to a recording paper.

Since the latent image forming means is singular, according to this method, the system can be more small-sized than the former method. Since, moreover, the latent image forming means is commonly used, the latter method is advantageous in retaining the latent images on the resists.

As a color image pickup system, there is also known a method by which filters and light sources are switched.

These color image inputting methods have been revealed to be effective for preventing the Moiré partly because they are basically reluctant to be followed by the color drifts and partly because they can make use of solid-state monochromatic image pickup elements of high resolution.

This implies that the deterioration in the images is highly caused by the mistaken color reproduction errors of the color judgement due to the dislocations of pixels and by the Moiré.

For superposition of the toner images, on the other hand, it has apparently become necessary to use a method for compensating the influences of the foregoing toner image retaining face, in place of the color correction method of B, G and R signals.

SUMMARY OF THE INVENTION

An object of the present invention is to eliminate the problems owned by the image forming methods of the prior art and to provide a color image forming apparatus for forming a color image at a high speed but at a low cost.

Another object of the present invention is to provide a color image forming apparatus which retains a clear color image without any color drift or the Moiré but with an excellent color reproductivity.

According to the present invention, there is provided a color image forming apparatus which comprises: color separation means for optically scanning a document to form a color-separated image; an image read-out unit for focusing the color-separated image on a single solid-state image pickup element; and a color output unit for transforming image data corresponding to the color-separated image sequentially to toner images to superpose the toner images on an image retainer.

An example of the mode of the color image forming apparatus according to the present invention has the following constructions and operations.

(1) An image read-out unit picks up color-separated images of B (blue), G (green) and R (red) colors on a monochromatic solid-state image pickup element by a color separation filter or a light source switching system. Because of the single image pickup element, each of the color-separated images can produce an excellent color image processing signal having no resist dislocation and little sensitivity dispersion in each color-separated image.

(2) The image signal read out is subjected to an A/D conversion and then to an image processing such as an MTF correction, a gradation correction or a binary coding. Because of a channel signal, the image processing is accomplished with different parameters for the individual color-separated images by sharing an image processing circuit among the color-separated images and by storing image processing parameters in a ROM or the like.

(3) The input of the color-separated images is accomplished for each frame by optically scanning on an image retainer in synchronism and it is transformed into a toner image.

By these steps, Y (Yellow), M (Magenta) and C (Cyan) (or BK (Black)) toner images are superposed on the image retainer to form a color toner image. The color toner image can then be fixed on a transfer paper.

The superposing process is advantageous for resist warranty of the electrostatic latent images to cause little drift of the toner images so that an excellent color copy image with little resist dislocation can be formed together with the excellent resist of the read image signal.

(4) In the superposition, there is a tendency that a subsequent toner is reluctant to be fixed on a previous toner image. On the other hand, the toners have different developing characteristics. Therefore, $\gamma$-corrections and threshold values are selected for the individual colors. In a denser portion, generally speaking, it is determined to increase the quantity of toner to be fixed at a later stage. In a thinner portion, on the other hand, the previous toner image exerts little influence.

(5) The variation in the spectroscopic distribution of the light source and the dispersion of the color separating filter and the lens are preferably warranted for the three (or four) colors. Because of the single solid-state image pickup element, the sensitivity disperses little for each read pixel, and an advantage is obtained for the data correction to control the quantity of fixation accurately. In the present method for superposing the toner images, the color reproduction of the color images to be formed is stabilized.

(6) In the present method, no color discrimination is accomplished based upon the B, G and R information. This makes it possible to output the input data with the unchanged resolution.

In case the color image is to be reproduced with the Y, M and C (and BK) toners, the M and C toner images are important for human visibility. The Y toner image is not so important for the human visibility. Therefore, the G and R image data corresponding to the fixation of the M and C toners become important. Especially the G and R image data are desired to have higher resolutions than that of the B image data.

The setting of the resolution is intrinsically desired to have no change for the lens systems and colors but is difficult.

It is, therefore, necessary desirable to set the resolution of the lenses for the G and R image data at a higher level in advance than that for the B image data.

Alternatively, the resolution for the G and R image data may be set higher by the MTF correction.

(7) The addition of the black toner in addition to the Y, M and C toners will deepen the image.

In the present invention, an ND (i.e., neutral density) filter can be provided to provide black data.

Since the image is blackened if the black data are outputted as they are, a predetermined threshold value is set. For a higher density, the black toner is applied as the image data to the image. This corresponds to the inking in the printing operation. It is quite natural to adopt another threshold value for the monochromatic printing operation.

Other objects and features of the present invention will become apparent from the following description to be made with reference to the accompanying drawings.

BRIEF DESCRIPTION OF THE DRAWINGS

FIG. 1 is a section for explaining the fundamental structure of a color image forming apparatus;

FIG. 3 is a front view of an optical information exchanging unit;

FIGS. 4A to 4C are graphs illustrating the spectroscopic characteristics of a light source, a color separating dichroic mirror and a CCD image sensor;

FIGS. 5A to 5C are graphs illustrating the spectroscopic reflecting characteristics of the color components of a color chart;

FIG. 6 is a graph illustrating an MTF value in an optical system scanning direction;

FIG. 8 is a graph illustrating the gradation characteristics of a dither image;

FIG. 9 is a diagram showing a dither matrix;

FIG. 10 is a graph illustrating inverse function curves of the gradation characteristics;

FIGS. 14A to 14C are circuit diagrams for explaining a synthetic control mechanism of the whole apparatus;

FIGS. 15A to 15F are time charts for explaining the relations between an image signal and a variety of timing signals;

FIG. 16 is a perspective view showing horizontal, vertical and effective scanning regions with respect to a document; and FIGS. 17A to 17Z, 17AA, 17BB, 17CC and 17DD, and FIGS. 18A to 18Z, 18AA, 18BB, 18CC and 18DD are time charts for explaining a series of processings in a color image forming process.

DESCRIPTION OF THE PREFERRED EMBODIMENTS

Figure 2:
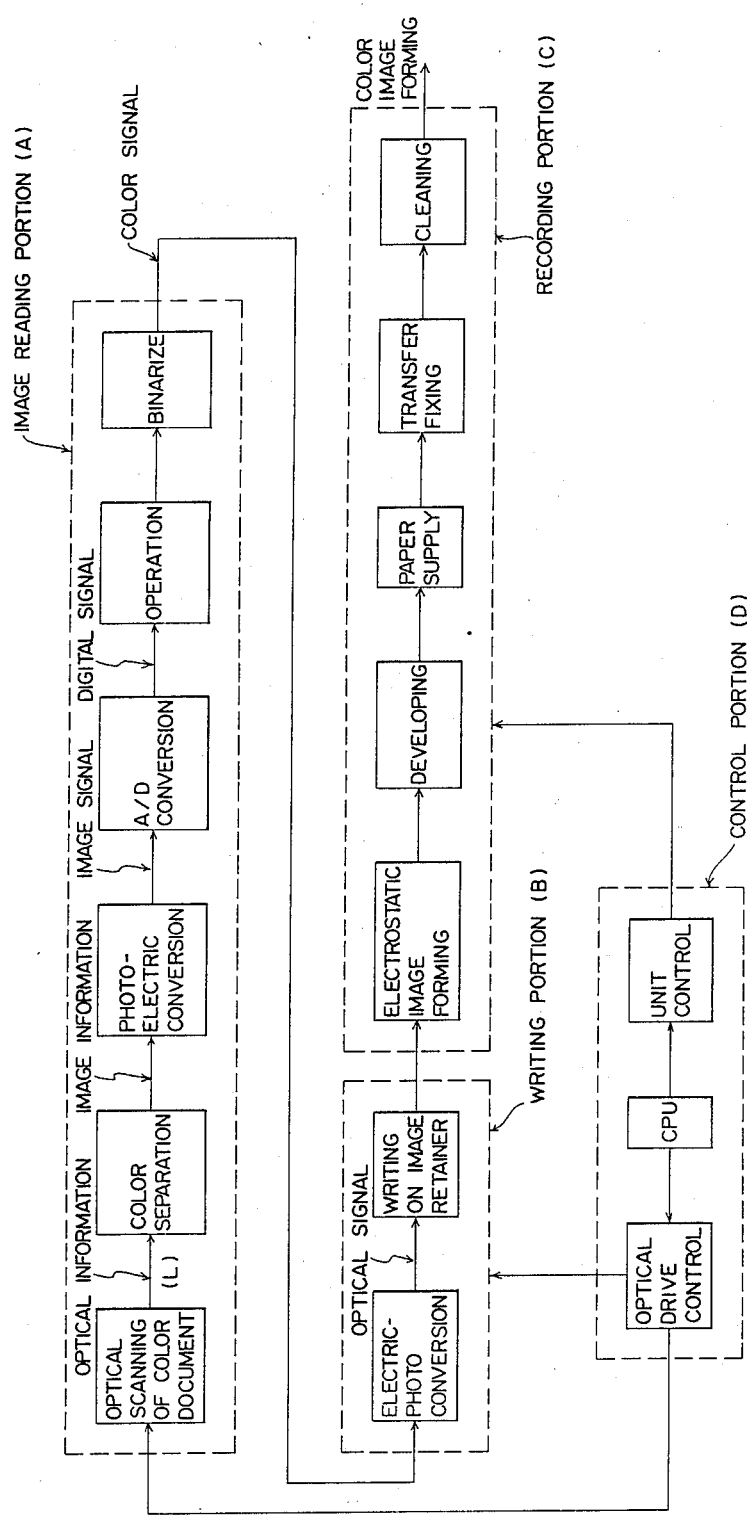
FIG. 2 is a block diagram schematically showing an image forming process.

FIG. 1 shows a color image forming apparatus having the following structure as an representative example. First of all, a color document has its colors separated into three blue, green and red colors by color separation means such as filters to be inserted sequentially into an optical path. The color-separated optical images thus formed are sequentially focused on a CCD image sensor or the like and are photoelectrically converted. These electric signals are then converted by an A/D converter into digital signals. Black information is also obtained by an ND filter.

These scanning operations are accomplished sequentially four times by switching the four filters.

These color signals are written in an image retainer through a write-in unit using a semiconductor laser to form an electrostatic image. This image is then developed to form a color toner image by means of a developing device corresponding to the color signals. This process is repeated by the number of times of the color signals to form such a multi-color toner image on the image retainer as have toner images of the individual colors superposed. The multi-color toner image is transferred to a transfer material and fixed thereon to form a color image.

In FIG. 1, when the copy button of a control panel coupled to a CPU 1 by a control circuit 304 is depressed, a document read-out unit A is driven under the control of an optical drive CPU 2 coupled through serial communication with the main control CPU 1.

First of all, a document 82 on a document glass plate 81 is optically scanned by an optical system. This optical system includes: a carriage 84 carrying light sources 85 and 86 and a reflecting mirror 87; and moving mirror unit 88 equipped with V-mirrors 89 and 89'. The carriage 84 and the moving mirror unit 88 are made to run on slide rails 83 at speeds of V and ½ V, respectively, by the action of a pulley 91 attached to a stepping motor 90 through a wire extended on pulleys 93 and 92. Thus, the optical information is obtained by illuminating the document 82 with the light sources 85 and 86 and is led out to an optical information conversion unit 100 through the reflecting mirror 87 and the V-mirrors 89 and 89'.

Incidentally, the light sources 85 and 86 are commercially available fluorescent lamps of warm white color for preventing a specific color from being stressed or attenuated on the basis of the light sources when they are used for optically scanning a color document. Moreover, the fluorescent lamps are lit with a high-frequency power source of about 40 KHz to prevent the flickering and heated with heaters to hold their tube walls at a constant temperature and to accelerate their warm-up. In case the light quantity is short, on the other hand, the light sources 85 and 86 may preferably be exemplified by halogen lamps.

On the other hand, the document glass plate 81 is equipped on the back of its two ends with reference while plates 97 and 98, which are to be optically scanned to normalize a later-described image signal.

Next, the optical information conversion unit 100 of the image read-out unit A is composed of a lens 101, blue, green, red and ND filters 102, 103, 104 and 105 made of multi-layered films and acting as color separation filters, a CCD 106 and a CCD substrate 107. In the optical information conversion unit 100 thus composed, the optical information led out from the aforementioned optical system is converged by the lens 101 and has its color separated into a red optical information corresponding to the Cyan toner by color separation means having the red color separation filter 104. This red optical information is focused on the light receiving face of the CCD 106 so that the image signal is outputted. Incidentally, the thickness of the color separation filter may be changed to correct the focal point of the lens 101 for each color.

The image signal thus outputted from the CCD 106 is subjected to an A/D conversion, an arithmetic operation such as a shading correction, a binary coding and so on, as will be described hereinafter. The color signal thus processed is outputted sequentially to the write-in unit B.

In this write-in unit B, a laser beam is modulated with the color signal to scan an image retainer 120 by a polygon mirror 112 which is being rotated in advance by a motor 110 when the power is ON.

When this scanning operation is started, the laser beam is detected by a laser beam index sensor (although not shown) for detecting the start of the later-described beam scan, to start its modulation with a first color (e.g., blue) signal. This modulated beam scans the image retainer 120 which is uniformly charged by a charging device 121 supplied with a high voltage from a high-voltage power 1 (323).

By the main scan with the laser beam and by the auxiliary scan caused by rotating the image retainer 120, this retainer 120 is formed thereon with an electrostatic image corresponding to the aforementioned first color signal (e.g., a red optical information signal).

For the red optical information supplied with a bias voltage from a high voltage power 2 (241a), for example, that electrostatic image is developed by a developing device 123 reserving the Cyan toner to form a Cyan toner image on the image retainer 120. Incidentally, the toner supply to the developing device 123 is temporarily performed under the control of the CPU 1 through a toner supply SD 2 (313). The Cyan toner image thus formed is moved in accordance with the rotations of the image retainer 120 while being released from the press contact of a cleaning blade 127 and is then uniformly charged by the charging device 121. After this, like the case of the aforementioned first color signal, an electrostatic image is formed on the basis of a second color signal (e.g., a green color optical information signal) and is developed by a developing device 124 reserving the Magenta toner biased by a high voltage power 2 (241b), to form a Magenta toner image in conformity with the aforementioned Cyan toner image. Next, like the foregoing first and second color signals, an electrostatic image is formed on the basis of a third color signal (e.g., a blue color optical information signal) and is likewise developed by a developing device 125 filled up with the Yellow toner biased by a high voltage power 2 (241c), to form a Yellow toner image in conformity with the foregoing Cyan toner image and Magenta toner image.

After a repeated charging operation, an electrostatic image is then formed on the basis of a fourth color signal (e.g., a white and black optical information through the ND filter). A black toner image is formed in conformity with the foregoing toner images by a developing device 122 which is charged with the Black toner biased by a high voltage power 2 (241d).

Thus, a multi-color toner image is obtained. Incidentally, although the description thus far made is directed to the formation of four color images, similar discussions are applied to the formation of a color image of three Y, M and C colors, or dichroic or monochromatic images.

The aforementioned developing devices 123, 124, 125 and 122 may scatter the toners to the image retainer 120, while being supplied with the AC or DC bias voltages from the high voltage powers 2 (241a to 241d), to accomplish their developments in a non-contact or inverse manner. Incidentally, the toner supplies to the developments 124, 125 and 122 are accomplished like the case of the developing device 123 in response to the signal coming from the CPU 1 by toner supplies SD3 (314), SD4 (315) and SD1 (312).

The multi-color image thus obtained is transferred to a transfer paper P, which is fed from a paper feed device 141 through a let-off roll 142 and a timing roll 143 while being timed with the rotations of the image retainer 120, by a transfer electrode 130 supplied with a high voltage from a high voltage power 3 (324), and are separated by a separation electrode 131. The transfer paper P thus separated by the separation electrode 131 is conveyed to a fixing device 132, which is controlled to a desired temperature by the microcomputer CPU 1 and is discharged to form a color image.

The image retainer 120 having ended its transfer is cleaned by a cleaning device 126 so that it may be prepared for a subsequent image formation.

In this cleaning device 126, a metal roll 128 supplied with a DC voltage from a high voltage power 4 (325) is arranged upstream of the blade 127 and out of contact with the image retainer so that the toners cleaned by the blade 127 may be easily recovered. This blade 127 is released from press contact at the end of the cleaning operation. In order to eliminate the unnecessary toners which might otherwise be left at the releasing instant, a cleaning auxiliary roller 129 is so brought into press contact with the image retainer 120 as to rotate in the opposite direction thereby to clean off the unnecessary toners sufficiently.

Described hereinbefore are the color image forming apparatus of the present invention and the fundamental structure for forming a color image by the use of the apparatus. There details will be described in the following.

FIG. 3 is a front view of the optical information conversion unit 100 built in the image read-out unit A. The unit 100 is composed of the focusing lens 101, the color separation filters 102, 103, 104 and 105, and the CCD 106 for receiving the color-separated images, which are obtained by the filters, to photoelectrically convert those images. The CCD 106 has a panchromatic spectroscopic sensitivity.

The CCD 106 is composed of a row of about 5,000 fine (as wide as about 7 microns) photoelectric elements which are arranged in a sensor size of 10×50 mm, for example.

In the prior art, there is known a method by which the optical information from the document image is separated by a prism or the like into optical beams and by which the beams are simultaneously received by a plurality of CCDs. If, in this case, the positional accuracy among the pixels of each CCD is not satisfied, the pixels cannot have their colors matched so that the colors of the color image cannot be reproduced.

In the present invention, the problem of the pixel dislocation does not arise because only one row of CCD elements are used.

Moreover, the present invention uses a CCD substantially having elements of 10,000 pixels to prevent the Moiré with a high resolution (as seen from FIG. 3). It is naturally necessary to hold a plurality of accuracies of scanning positions.

This makes it necessary that the individual components of the aforementioned focusing lens 101, color separation filters 102, 103, 104 and 105 and CCD 106 be so designed as to be precisely constructed and to have no malfunction even with the changes in the surroundings, the mechanical vibrations and so on. The optical system per se has to be designed to have no color aberration.

In the present invention, the aforementioned individual components are constructed, as follows, to satisfy the above-specified requirements.

As shown in FIG. 3, the CCD 106 is integrally fixed on a base 107 by means of adhesion through fixing members K1 (K2). In the case of adhesion, for example, the two fixing members K1 and K2 are adhered to the righthand and lefthand sides of fixing members 102a and 102b and have their leading end faces adhered to the lefthand and righthand ends (or the upper and lower ends, as shown) of the CCD 106 to unite the fixing members K1 and K2 with the lens system.

The color separation filters 102 to 105 are so fixed in the optical path between the focusing lens 101 and the CCD that their lefthand end faces can rotate. The color separation filters used are: Kodak Wratten 25 for R; Kodak Wratten 58 for G; and Kodak Wratten 47 for B. It is more preferable to use interference filters as the color separation filters.

For the rotations, for example, a spindle 108 is connected to a motor while carrying an encoder. A desired filter is stopped at a designated position by detecting the pulses of the encoder or the perforations formed in the encoder by means of a photosensor.

On the other hand, the aforementioned lens 101 is fixed on a support member 109a by fixing a lens holder 109b with screws p4. Incidentally, optical positions have to be strictly set by adjusting members before the individual components are fixed by means of the aforementioned adhesion or screws.

Thus, the optical information conversion unit 100 to be mounted on the color image forming apparatus of the present invention is freed from any structural disorder even with temperature changes or mechanical vibrations so that at least three kinds of colorseparated information are sequentially read out in a complete manner on one CCD 106.

For reference, as shown in FIG. 4(A), there is shown one example of the spectroscopic characteristics of the document scanning light sources 85 and 86, in which the abscissa plots the wavelength (nm) whereas the ordinate plots the relative intensity (%). FIG. 4(B) shows one example of the spectroscopic characteristics of the filters 102 to 105 exemplifying the color separation means, in which the abscissa plots the wavelength (nm) whereas the ordinate plots the transmissivity (%). FIG. 4(C) shows one example of the spectroscopic characteristics of the CCD 106, in which the abscissa plots the wavelength (nm) whereas the ordinate plots the relative sensitivity (%). Thus, the blue, green, red and black image signals thus obtained through the photoelectric conversions by the CCD 106 are digitalized by the A/D converter and processed through an arithmetic circuit for the MTF correction or the $\gamma$-transformation and through a binary- or multi-value-coding dircuit using the dither pattern so that they are outputted as the color signals to the write-in unit B to modulate the semiconductor laser of the same unit B.

The read-out system of the present invention can employ not only a reduction optical system but also a contact image sensor.

In this case, too, the color separation filters can be alternately interposed between the light sources and the sensors to produce the image data.

On the other hand, the focusing system has a color aberration. In the present embodiment, the mechanical pixel dislocation for each color is eliminated by giving the color separation information to one solid-state image pickup element.

It is, however, difficult for the ordinary design of the focusing system to eliminate both the color aberration and another aberration (such as the spherical aberration, the astigmatism or the coma). In view of this difficulty, the preferable design is to give a preferance to the correction of the color aberration.

The remaining aberrations are corrected by the MTF corrections in the arithmetic unit. At this time, the correction factors of the MTF corrections are changed for the R, G, B and BK channels. If the focal point is made at the G channel, for example, the correction factors of the R and B channels are set at higher levels.

More specifically, the processings of the aforementioned arithmetic unit and binary-coding unit are accomplished in the following manners.

FIGS. 5A to 5C are diagrams schematically illustrating the spectroscopic reflecting characteristics of the color components of the color charts. FIG. 5A illustrates the spectroscopic reflecting characteristics of the achromatic colors such as black and grey; FIG. 5B illustrates the spectroscopic reflecting characteristics of the blue color; and FIG. 5C illustrates the spectroscopic reflecting characteristics of the red color. The abscissa plots the wavelength (nm) whereas the ordinate plots the reflectivity (%).

The aforementioned interchangeable color separation filters are incorporated into the image pickup unit.

Figure 12:
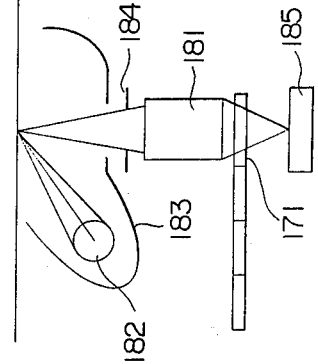
FIG. 12 is a diagram showing the structure of an image read-out unit.
Figure 11:
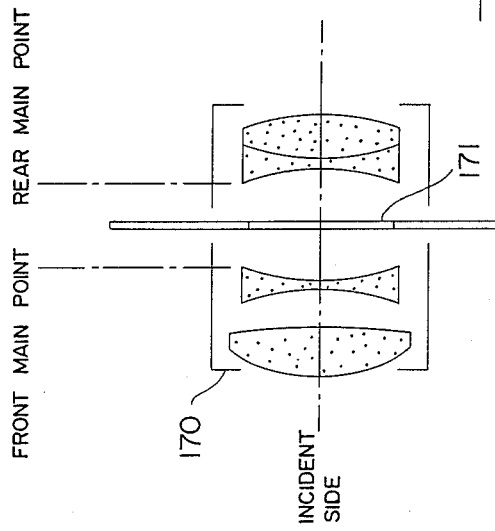
FIG. 11 is a diagram showing the structure of an optical system using a color separation filter.

A color separation filter 171 is set, as shown in FIG. 11, not only at the back but also in front of a lens system 170 and between the lenses and is used in front and at the back of an optical converging element in a contact color image sensor. FIG. 12 shows the image read-out unit using an optical converging element 181. In FIG. 12, reference numerals 182, 183, 184 and 185 designate an exposure lamp for exposing the image, a reflecting mirror, a slit and a contact image sensor, respectively.

Now, if the levels of the blue, green, red and black colors, which have been photoelectrically converted by the aforementioned CCD and normalized with the white plate, are designated at VB, VG, VR and VBK, the Yellow, Magenta, Cyan and Black toner images can be formed on the basis of the γ-correction table prepared by reproducing the individual toner images from the levels BV, VG, VR and VBK of those individual signals. Incidentally, the following points have to be considered when the γ-correction table is to be determined.

(I) In order to express an intermediate tone, the image processings of the dither pattern and the multi-value coding (of the pulse width and the density pattern) are introduced. These processings are desired to be stable for the changes in the output conditions (such as the charging or developing conditions).

(II) The value of the table are so determined as to reproduce the color densities of the document read out.

(III) The detection of the black component is accomplished by the use of the ND filter. The achromatic colors including the black extend over all the visible range, and their integrated quantity of the reflected lights is smaller than that of chromatic colors. Therefore, an image having a smaller quantity of reflected light than a constant value is judged to be black, and the Black toner is added together with the Yellow, Magenta and Cyan toners.

The image signals from the read-out unit are sent to the write-in unit through: the shading correction for correcting the dispersions in the illumination of the scanner and the sensitivity of the sensor to convert them into the digital signals; the A/D conversion unit; the MTF correction unit for correcting the drop of the MTF of the optical system of the image scanner; the gradation correction unit for correcting the gradation of the dither pattern of the electrophotographic printer of the recording unit; and the binary-coding unit for the binary-coded image signals. For enlarging or reducing the size, a circuit is preferably connected between the shading correction and the binary coding.

The image signals obtained from the image scanner are influenced by the shading effect. The shading correction method to be adopted in the present invention is accomplished by multiplying the image signals by a shading correction coefficient stored in a memory. Since this method is accomplished by changing the reference voltage of the A/D converter for each sample point of an image, it is advantageous in that the circuit structure is simple and in that the correction can be made even in case the sensitivity disperses for each pixel as in the semiconductor image sensor. By scanning the reference density plate at first, the maximum luminance is incorporated so that the digital signals quantized from the luminance with a sampler and a fixed reference voltage are written in the image memory.

Next, the image pickup signals are read out and sampled. When these sampled image signals are to be quantized, the pixels levels of the reference density plate corresponding to the individual pixels of the image sensor are read out from the image memory and converted into reference voltage levels with reference to the shading correction memory and further from digital to analog voltages. The image signals are digitized with reference to the converted analog voltage so that the digital signals are sent to the MTF correction unit.

Incidentally, with the resolution correction after the A/D conversion and before the multi-value coding, as described above, practical merits can be obtained to reduce the circuit scale or simplify the determination of the correction parameters, because only one information is processed.

Now, the causes for degrading the MTF when an image is to be recorded and reproduced will be generally enumerated in the following:
(1) Optical System;
(2) Optical Running System;
(3) Processing Circuit; and
(4) Recording System.

As to the optical system (1), the performances of the optical system will be fluctuated in accordance with the MTF of the lens (for different wavelength ranges, the changes in the image height, the allowable width of the focal position, and the working accuracy), the accuracy of the prism faces, the mounting accuracy of the CCD, the warp of the CCD chip and the spectral fluctuations of the light sources.

As to the optical running system (2), there can be enumerated the vibrations of the optical mirror and the fluctuations in the moving speed.

As to the processing circuit (3), there are signal wave distorsions due to the capacitance components in an analog circuit, such as the signal distorsions caused by the passage through transmission lines.

As to the problem of the recording system (4), the following points can be enumerated:
The diameter and shape of the laser beam;
The developing characteristics (such as the sticking amount, density, particle diameter and color of the toner) of the toners on the photosensitive drum;
The transfer characteristics (such as the transfer percentage or the transfer characteristics to the transfer paper); and
The fixing characteristics (such as the fluctuations in the toner diameter before and after the fixation).

Of these, the cause exerting direct influences upon the degradation of the resolution is the optical system and its running system.

FIG. 6 illustrates the MFT values (before correction) in the main and auxiliary scanning directions when the optical system is driven. These characteristics are measured values when the white and black pattern having a space frequency of 2 to 16 dots/nm is scanned.

In this case, the MTF used is defined by the following formula:

$$MTF = (W - BK)/(W + BK) \, (\%),$$

wherein W designates a white signal whereas BK designates a black signal.

As is apparent from FIG. 6, the degradation in the MTF is more serious in the auxiliary scanning direction. For similar corrections, it is sufficient to set the corrections in the auxiliary scanning direction two to four times as high as those in the main scanning direction.

In order to improve the reproduction of thin lines of the image, it is said that 30% or more is necessary for the MTF value.

In case, therefore, the resolution correcting means is constructed by the weighing and adding process of a noted pixel and its surrounding pixels, a convolution filter using image data of 3×3 pixels may be adopted as the resolution correcting means so as to correct the aforementioned main and auxiliary directions at an equal level while preventing the reproductivity of the thin lines from being degraded.

The filter elements and the corresponding pixel positions (i, j) are written at the lefthand and righthand sides, respectively, as follows:

$$\begin{pmatrix} abc \\ def \\ ghi \end{pmatrix}, \begin{pmatrix} (i-1,j-1) & (i-1,j) & (i-1,j+1) \\ (i,j-1) & (i,j) & (i,j+1) \\ (i+1,j-1) & (i+1,j) & (i+1,j+1) \end{pmatrix}.$$

Eight pixels surrounding the density Iij of the pixel (i, j) are noted. If, at this time, new density values for (i−1, j−1) to (i+1, j+1) are designated at Iij', the following formula holds:

$$Iij = Iij \times Cij,$$

wherein Cij designates a filter coefficient which is expressed by Cij=a, b, c, . . . , and i.

One example of the filter coefficients for realizing the aforementioned correction content is exemplified, as follows:

$$\frac{1}{2}\begin{pmatrix} 0 & -2 & 0 \\ -1 & 8 & -1 \\ 0 & -2 & 0 \end{pmatrix} \rightarrow \begin{pmatrix} 0 & -1 & 0 \\ -0.5 & 4 & -0.5 \\ 0 & -1 & 0 \end{pmatrix}.$$

In order to increase the correction quantity, it is sufficient to set the filter coefficients accordingly.

Figure 7:
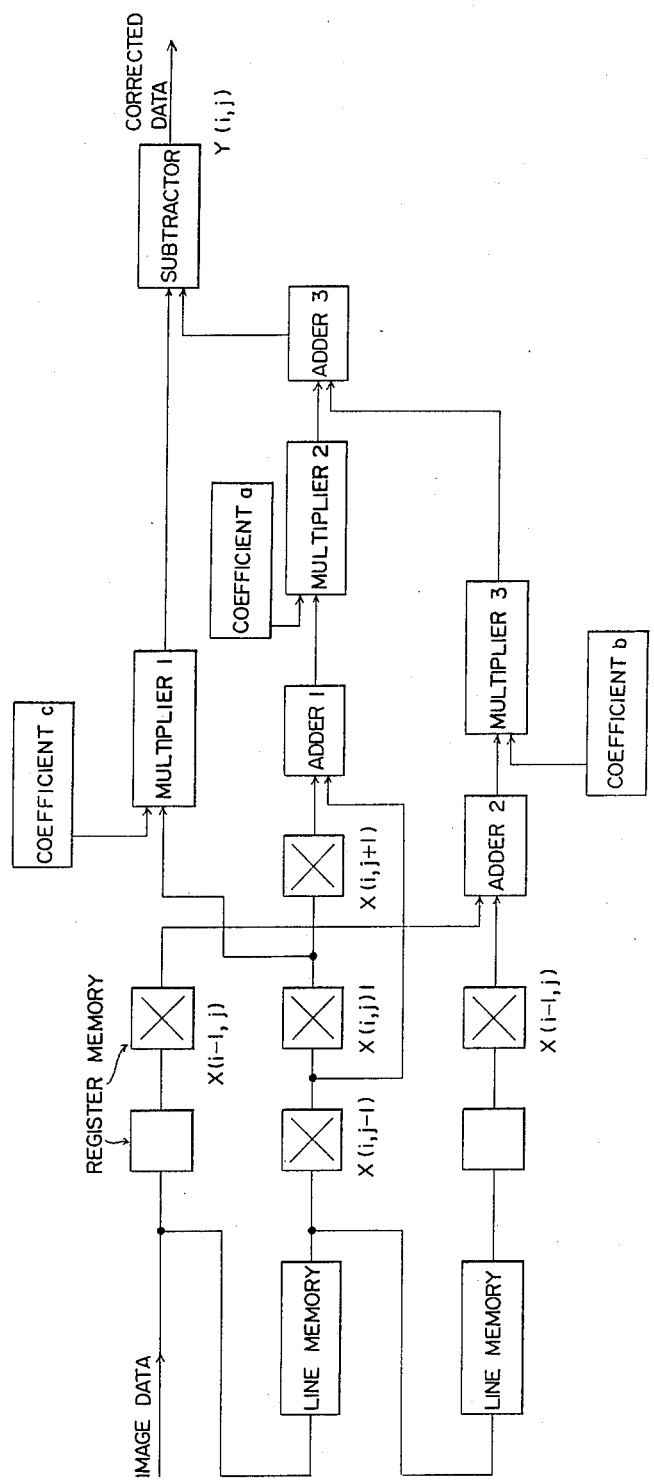
FIG. 7 is a circuit diagram showing one example of resolution correcting means.

FIG. 7 is a circuit diagram showing one example of the resolution correcting means using the convolution filter.

As shown, the image data are set sequentially in register memories and line memories. Of the image data, the data necessary for preparing correction data Y(i, j) are X(i−1, j), X(i, j−i), X(i, j), X(i+1, j) and X(i, j+j+1).

Now, if the convolution filter matrix is expressed in the following form, the correction data are determined by $Y(i, j) = CX(i, j) - [a\{X(i, j+1), X(i, j+1)\} + b\{X(i-1, j) + (i+1, j)\}]$:

$$\begin{pmatrix} 0 & -b & 0 \\ -a & c & -a \\ 0 & -b & 0 \end{pmatrix}.$$

More specifically, the center data X(i, j) have their coefficient c multiplied by a multiplier 1, and the multiplied data are sent to a subtractor. On the other hand, the terms X(i, j−1) and X(i, j+11) are added by an adder 2 and are multiplied by the coefficient b. The resultant data are fed to an adder 3. This adder 3 adds the above-specified two data and sends the added data to the subtractor. This subtractor outputs the correction data Y(i, j). Incidentally, in case the MTF values are different for the R, G and B signals, it is preferable to change the value of the MTF correction convolution filter matrix. After this MTF correction, the gradation is corrected.

FIG. 8 illustrates the gradation characteristics of the dither image and plots the relationships between the individual dither pattern levels of the Yellow, Magenta, Cyan and Black toners and the densities of the reproduced images.

The image densities were measured with the complementary colors of blue, green and red colors, respectively, for the Yellow, Magenta and Cyan toners. The dither matrix for binary-coding by the dither method is shown in FIG. 9. The gradation correction method is illustrated in FIG. 10, if a curve having the relation of an inverse function relative to the gradation characteristic curves plotted in FIG. 8 is considered. The gradation correction is accomplished by the use of the gradation correction curves. However, the Black toner is used only for an input image density higher than a predetermined value, because it compensates the shortage of the density after the developments with the Cyan, Magenta and Yellow toners.

Figure 13:
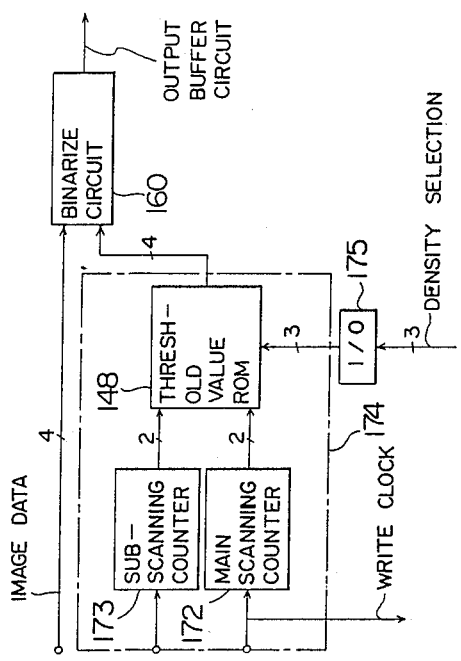
FIG. 13 is a diagram showing a binary coding circuit.

FIG. 13 is a diagram showing one example of the binary-coding circuit 160.

In FIG. 13, the threshold table 174 is composed of a main scanning counter 172 for counting the write clocks, an auxiliary counter 173 for counting horizontal synchronous signals, and a matrix (of ROM) 148 for outputting predetermined threshold data on the basis of the counted values of those counters 172 and 173.

In case the document to be read out is a line drawing, the threshold data to be used have a constant threshold value corresponding to the density. If, on the contrary, the document is a photograph, the binary-coding is preferable, using the dither method. In this case, the dither matrix is used as the threshold data. About three kinds of dither matrixes are prepared and selected in accordance with the density of the document.

The image data outputted from a gradation correction circuit 150 are compared in the binary-coding circuit (or comparator) 160 with predetermined threshold data obtained from the threshold table 174 and are binary-coded for each pixel.

The modulated laser beam for each color, which has its liquid quantity controlled efficiently in accordance with the program of the CPU 1, is written on the image retainer 120 to form an electrostatic image so that a color image is formed by using a plurality of the developing devices reserving the toners of different colors.

As has been described above, individual color signals are written on the image retainer 120 to form electrostatic images of different colors, which are then developed by the corresponding developing devices to form a multi-color toner image. The developed color toner images are required to be sufficiently registered. For these requirements, the individual developing devices have to be properly constructed, arranged and controlled and to be made compact so as not to enlarge the size and complicate the apparatus. With this in mind, developing means C to be built in the color image forming apparatus of the present invention has the following structure.

Figure 14A:
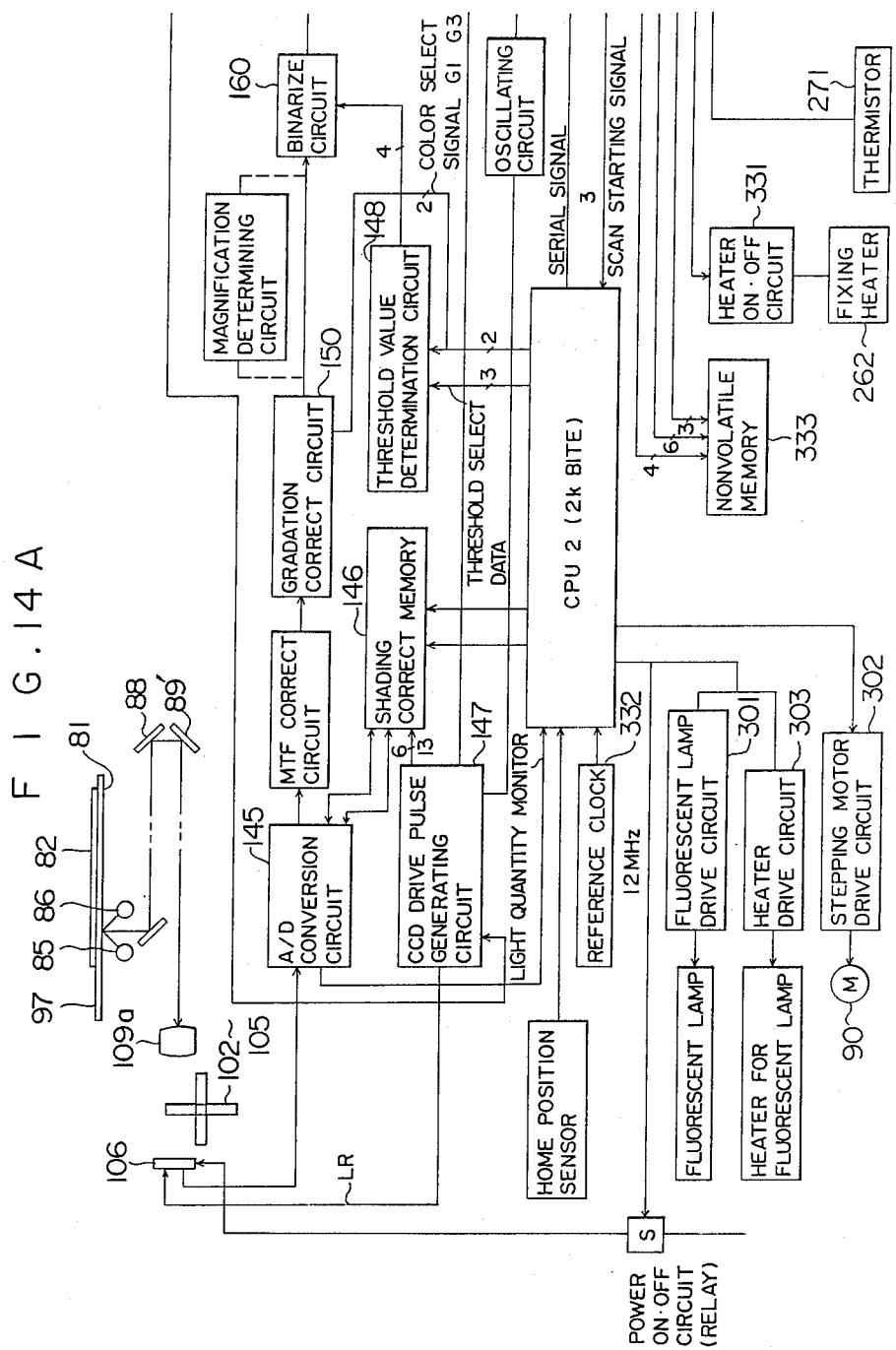
Figure 14C:
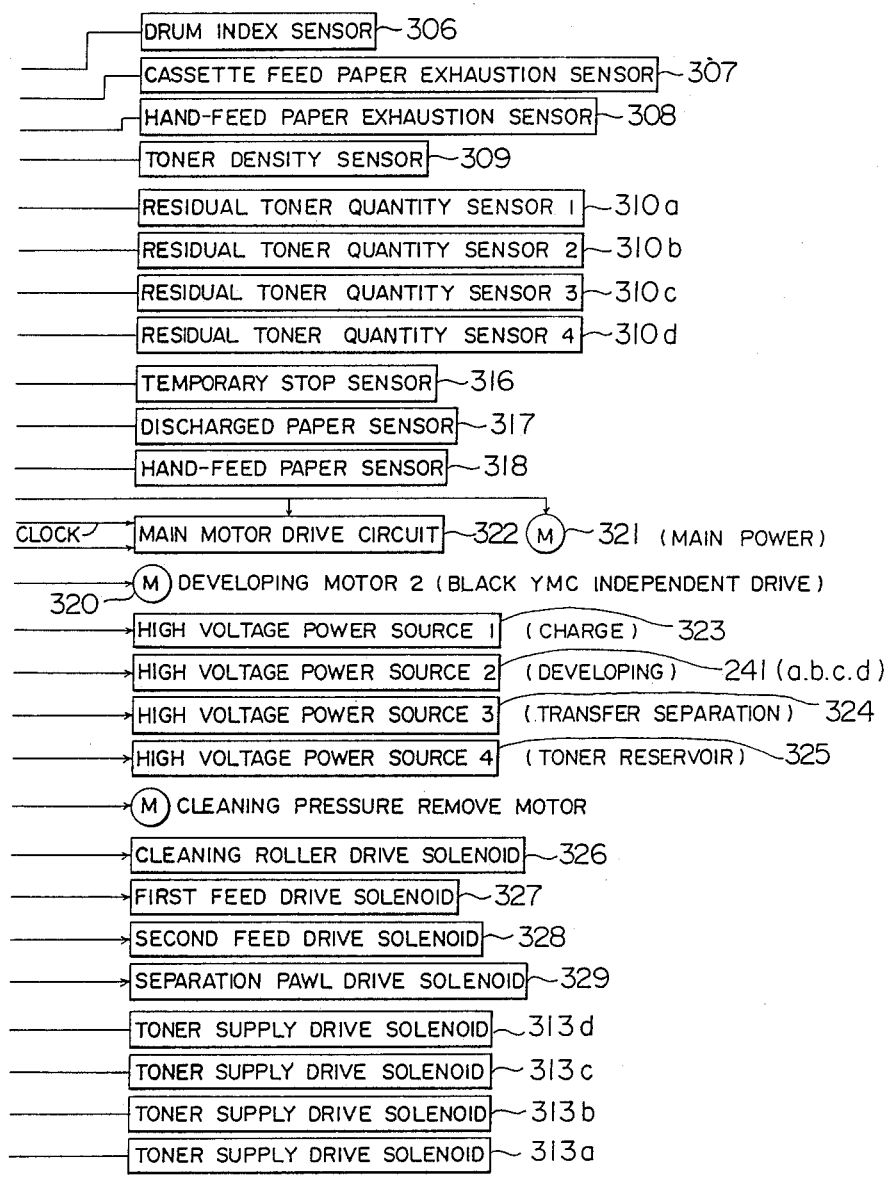

The synthetic control mechanism of the color image forming apparatus of the present invention will be described in the following with reference to FIGS. 14A to 14C and the circuit diagrams of its other parts. In FIGS. 14A to 14C, as has been described hereinbefore, the optical information from the color document 82 is separated into the B, G, R and BK color-separated pieces of information of transmission light by the color separation filters 102 to 105 and are introduced into the CCD 106 so that their individual image signals are outputted. The individual color separation filters are sequentially set by the color separation drive motor and the color separation filter position sensor.

FIGS. 15A to 15F illustrate the relationships between the image signals and the various timing signals. The horizontal valid range signal (H-VALID) (in FIG. 15C) correspond to the maximum document read-out width W of the CCD 106, and the image signal in FIG. 15F is read out in synchronism with the synchronous clock CLK (in FIG. 15E) coming from a counter clock circuit 299 of FIGS. 14A to 14C.

These image signals are fed through a normalizing amplifier (although not shown) to an A/D converter 145 shown in FIGS. 14A to 14C so that they are converted into digital signals of a predetermined bit number.

For the A/D conversion, the shading correction is carried out. For this correction, a shading correction memory 146 is prepared to extract one line of the white image data from the outside of the image read-out region. After these white image data have been stored, they are used as the shading correction data.

Thus, the memory 146 is read out in synchronism with the clocks of a CCD drive pulse generating circuit 147. This generating circuit 147 is equipped with the clock circuit 299. The timing of the memory 146 is regulated by both the scan starting index signal fed from an index sensor 199 of FIGS. 14A to 14C to the circuit 147 and the control signal coming from the CPU 2.

As has already been described, a blue correction ROM, a green correction ROM, a red correction ROM and a black correction ROM are stored independently with the density data (or values corresponding to the densities) in the individual color regions.

Here, as shown in FIG. 16, the main scanning direction with respect to the document is oriented in the line direction (or horizontal direction) of the CCD 106 with respect to a scanning plane, whereas the sub-scanning direction is oriented in the vertical direction (or vertical scanning direction) with respect to the line of the CCD 106.

The color signals C, M, Y and BK after the gradation corrections are coded into binary color signals by the binary-coding circuit 160 appearing in FIGS. 14A to 14C.

The selection signal with respect to the color signals is sent out from the CPU 2 (i.e., the second microcomputer).

The selection signal has different output states between the cases of the three-color recording black-addition mode or a color changing mode and a monochromatic recording or color-designated recording mode.

Incidentally, the conversions of the three color signals from the color document are accomplished for each rotation of the image retainer 120.

As the principle of color separation has already been described with reference to FIG. 5, the γ-correction is accomplished on the basis of the map which is stored with the density data of 6 bits corresponding to the reflection density of the color document.

Thus, a high-fidelity color reproduction can be accomplished by the remarkably specific and clear circuit structure to form a clear color image.

Next, the color signals to be outputted through the gradation correction circuit 150 of FIGS. 14A to 14C are inputted to the binary-coding circuit having been described with reference to FIG. 13 and, if necessary, to an enlarging/reducing circuit so that they are binary-coded and outputted to an interface circuit 295.

The interface circuit 295 of FIGS. 14A to 14C is constructed of a first interface 2951 for receiving the binary data and a second interface 2952 for receiving the binary data sent out from the first interface 1951.

The first interface 2951 is fed with the horizontal and vertical valid range signals (H-VALID) and (V-VALID) from a timing circuit 296 and with clocks of a predetermined frequency (e.g., 6 MHz in this example) from the counter clock circuit 299.

The CCD drive clocks are also fed. As a result, the binary data are sent out to the second interface 2952 in synchronism with the CCD drive clocks only while the horizontal and vertical valid range signals are being generated.

The counter clock circuit 299 is synchronized with the index signal (as will be described hereinafter) indicating the starting position of the laser beam scan. This is because an image without any flicker is to be formed by having the sent-out timing of the binary data synchronizing with the rotations of the polygon motor.

A second interface 1952 is one for selectively sending out the binary data coming from a first interface 1951 and the other image data to the write-in unit B.

The remaining image data will be specified in the following.

The first are the test pattern image data obtained from a test pattern circuit 297; the second are the patch image data obtained from a toner density controlling patch circuit 298; and the third are image and letter data obtained from a printer control circuit 294.

The test pattern image data are used for inspecting the image processing, and the toner density detecting patch image data are used for the patch processing.

Both the test pattern circuit 297 and the patch circuit 298 are driven on the basis of the clocks of the counter clock circuit 299 so that they may be timed with the binary data sent out from the first interface 2951.

The binary data outputted from the second interface 2952 are used as the modulated signal of the laser beam for the write-in unit B.

Next, all the aforementioned individual units and circuits of the color image forming apparatus of the present invention are controlled by the CPUs 1 and 2.

Therefore, the CPU 2 will be first described in the following. This CPU 2 is a microcomputer for controlling the optical drive, and the communications of the various information signals with the main control first microcomputer CPU 1 are serial.

On the other hand, the optical scan starting signal sent out from the first microcomputer CPU 1 is fed directly to the interruption terminal of the second microcomputer CPU 2.

This second microcomputer CPU 2 generates a variety of instruction signals in synchronism with the clocks of a predetermined frequency (e.g., 12 MHz) obtained from a reference clock circuit 332.

The instruction signal for detecting and storing the shading correction data is sent out from the second microcomputer CPU 2 to the shading correcting memory 146. A selection signal for the density selection and the color selection signal for the color recording are fed to a threshold value determining circuit 148.

The following control signals are outputted from the second microcomputer CPU 2.

A first control signal for turning on and off the drive power of the CCD 106 is fed to a power control circuit S.

A predetermined second control signal is fed to a drive control circuit 301 for driving the light sources (such as fluorescent lamps 85 and 86) for illuminating the document 82 with necessary light.

A third control signal is fed to a drive circuit 302 for driving a stepping motor 90 to move the color separation filters 102 to 105 before the CCD 106.

A fourth control signal is fed to a control circuit 303 for the luminance stabilizing heater (although not shown) of the light sources 85 and 86.

Incidentally, the second microcomputer CPU 2 is fed with the data indicating the luminance information of the optical unit and the light sources 85 and 86 and the home positions.

The first microcomputer is mainly for controlling the color image forming apparatus body, and the input and output systems of the apparatus body will be described in the following with reference to FIGS. 14A to 14C.

A variety of input data such as those for designating the magnification, the recording position and the recording color by the control panel are inputted to the control circuit 304, or their contents are displayed in the control circuit 304.

The display means used has an element such as an LED or a liquid crystal display.

A paper size detection circuit 305 is used in case the size of cassette papers stacked in a tray is to be detected and displayed or to be automatically selected in accordance with the size of the document.

A drum index sensor 306 detects the rotational position of the drum or image retainer 120 to control the timing of the electrostatic processing step with its index signal.

A cassette-feed paper exhaustion sensor 307 detects whether or not the papers in the cassette are zero. A hand-feed paper exhaustion sensor 308 detects the existence of the hand-feed paper in the hand-feed mode.

A toner density sensor 309 detects the toner density on the drum 120 or after the fixation. If the toner density is lower than a reference value, toner supply solenoids 313a, 313b, 313c and 313d are driven, if necessary.

Moreover, four residual toner quantity sensors 310a, 310b, 310c and 310d detect the individual residual toner quantities in toner reservoirs 232a, 232b, 232c and 232d in the individual developing devices 122 to 125. If the toner is exhausted, an exhaustion indication element (although not shown) on the control panel is controlled to be lit.

A temporary stop sensor 316 detects whether or not the papers are correctly fed from the cassette to the second paper feed roller (although not shown) while the color reproducing machine is being used. Then, the temporary stop sensor 316 stops the paper feed by the first paper supply roller for a while.

A discharged paper sensor 317 is used to detect whether or not the papers after the fixation, as contrary to the aforementioned operation, have been correctly discharged to the outside.

A hand-feed paper sensor 318 is used to detect whether or not the feed is effected by the hand.

The sensor outputs of the individual sensors described above are introduced into the first microcomputer CPU 1 so that the necessary data are displayed on the operation display unit 304 or so that the drive state of the color reproducing machine is controlled, as desired.

In the case of the color reproducing machine, a motor 320 especially for the black is provided in addition to the motors for the Cyan, Magenta, Yellow developments, all of which are controlled by the instruction signals coming from the first microcomputer CPU 1. Likewise, a main motor (or drum motor) 321 has its drive state controlled by a PLL-controlled drive circuit 322, which also has its drive state controlled by the control signal coming from the first microcomputer CPU 1.

For the color development, it is necessary to apply a predetermined high voltage to the developing devices in operation. For this necessity, there are provided the charging high voltage power 323, the developing high voltage powers 241 (a, b, c and d), the transfer and separation high voltage power 324, and a high voltage power 325 for a toner receiving metal roller 288, all of which are supplied with the predetermined high voltages, if necessary.

Incidentally: reference numeral 326 designates a press contact and release drive solenoid of a cleaning auxiliary roller 290; numeral 327 a first feed drive solenoid; numeral 328 a second feed drive solenoid; and numeral 330 a press contact releasing motor for a cleaning blade 281 and the cleaning auxiliary roller 129. Moreover, numeral 329 designates a separation pawl drive solenoid for turning on and off the separation pawl.

The second feed roller is used for feeding out the papers carried by the first feed roller at a proper timing.

A fixing heater 262 is controlled by a fixing heater ON/OFF circuit 331. The surface temperature of a fixing heat roller 261 is monitored by a thermistor 271. Numeral 300 designates a clock circuit (at about 12 MHz).

A nonvolatile memory 333 attached to the first microcomputer CPU 1 stores the counted number of the copy papers and the total number in the course of the image formation at the set initial value and continues the copying operations from the counted number before a trouble, when the copying operation is restarted after the previous operation is interrupted by an accidental trouble such as the interruption of service or jamming.

Thus, the first and second microcomputers CPU 1 and CPU 2 executes the various controls necessary for the color image processing in accordance with a predetermined sequence.

Next, in the color image forming apparatus having the construction thus far described, the multi-color image formed on the image retainer by the digital method is transferred and fixed to form a color image. As a result, the individual color toner images composing the multi-color toner image are required not to have their colors mixed but to be clear independently of one another. Moreover, the individual color toner images are required to be composed of images of fine dots of 50 to 80 microns and with sufficient resolutions. In the present invention, therefore, the developers and the developing methods to be used for satisfying those requirements have the following specifications.

[DEVELOPER]

The developer to be used in the present invention is a two-component developer composed of the toner and the carrier because it is advantageous in that it is feasible in the control of the frictional charging of the toner and excellent in developability and in that the toner can be arbitrarily colors.

[DEVELOPING METHOD]

In the present invention, with the use of the two-component developer described above, the toners are flown and selectively applied for the development to the electrostatic image on the image retainer by the oscillating electric field of the AC bias applied, in a state that the image retainer and the developer layer are kept away from contact with each other and no developing bias is applied.

Thanks to the use of the non-contact developing method, in case the multi-color toner image composed of the Blue, Red and Black toner images is to be formed by a plurality of developments on the image retainer, the previous toner image is not damaged by the subsequent development, but the development per se can be accomplished in a thin layer.

Although the embodiment of the present invention has been described in detail by using the filters as the color separation means, an optical image having its colors separated similarly to those of the filters can be formed even by using a plurality of light sources having different spectroscopic characteristics for illuminating the document.

Since the color image forming apparatus uses only one photoelectric conversion means, as described above, there arises no positional displacement among a plurality of photoelectric conversion means, if used. Since the electrostatic latent images are allowed to have less dislocation than that of the case of super-position on the transfer member by superposing the color toners on the image retainer, a better resist is obtained as the color image to be formed. In case, on the other hand, the toners are to be superposed on the image retainer, it is necessary to strictly control the quantities of the developing toners to be applied. Since the color images are read out by the single photoelectric conversion means, the dispersion in the relative spectroscopic sensitivities of the color-separated images is reduced to provide an effect the color reproduction is stabilized. Still, moreover, the image processing circuits for processing the individual color-separated image signals can be shared to reduce the scale of the circuit. Because of the single photoelectric conversion means and because of unnecessity for the transfer drum for repeatedly transferring the toner images to the transfer member, the overall apparatus can be manufactured in a compact size and at a reasonable cost.

It has also been found that the particle diameters of the toners to be used are desired to be as small as possible for facilitating the control of the color reproduction. This is because the smaller toner particle diameter could suppress the potential of the charges of the toners themselves at a lower level, in case the toner images are superposed, even if the toners are applied in a quantity for the same apparatus, so that the control range of the toner quantities for the superposed development can be widened.

As has been described hereinbefore, according to the color image forming apparatus of the present invention, the system size can be made compact and at a reasonable cost. Moreover, all the processing steps are controlled on real time so that the operability becomes excellent. Another advantage is that an office color copy of high quality can be easily obtained.

Further, according to the color image forming apparatus of the present invention, an original image can be converted into an image of any color by applying a method of developing a latent image with toners of a plurality of colors as shown in U.S. Pat. No. 4,666,804. In this case, the combination of a color of filter selected with respect to the image exposure and a color of toner to be used for the developing can be considered.

What is claimed is:

1. A color image forming apparatus comprising color separation means for obtaining a color-separated image of a specific color, changeover means for changing a color component to be separated by said color separating means, a single photo-electric converting means for converting said color-separated image into an electric signal, a single signal processing means for forming image data by processing an output signal of said photo-electric converting means, latent image forming for forming a latent image on an image retainer based on said image data, and a plurality of developing means having therein toners each different in color for developing said latent image, wherein a step for forming a toner image on said image retainer is repeated plural times by selecting one of said plural developing means corresponding to a specific color by said changeover means, so that a multi-color toner image is formed on said image retainer.

2. The color image forming apparatus according to claim 1, wherein said signal processing means is able to vary the parameter according to a color component specified by said changeover means.

3. The color image forming apparatus according to claim 1, wherein said signal processing means has such a function as to correct the gradation of the image data.

4. The color image forming apparatus according to claim 2, wherein said signal processing means has such a function as to form the image data by comparing an input signal with a reference signal, and said reference signal is varied according to the color component specified by said changeover means.

5. The color image forming apparatus according to claim 1, wherein said signal processing means has such a function as to correct an MTF of the image data.

6. The color image forming apparatus according to claim 1, wherein said color separating means is composed of a plurality of spectral filters each different in spectral property.

7. The color image forming apparatus according to claim 6, wherein said color separating means is composed of a plurality of interference filters each different in spectral property.

8. The color image forming apparatus according to claim 1, wherein said color separating means is composed of a plurality of light sources each different in spectral property for illuminating the document.

9. A color image forming apparatus comprising color separation means for obtaining a color-separated image of a specific color, changeover means for changing a color component to be separated by said color separating means, a single photo-electric converting means for converting said color-separated image into an electric signal, a single signal processing means for forming image data by processing an output signal of said photoelectric converting means, latent image forming for forming a latent image on an image retainer based on said image data, and a plurality of developing means having therein toners each different in color for developing said latent image, wherein a step for forming a toner image on said image retainer is repeated plural times by selecting at least one of said plural developing means corresponding to a specific color by said changeover means, so that a multi-color toner image is formed on said image retainer.

10. A color image forming apparatus comprising color separation means for obtaining a color-separated image of a specific color, changeover means for changing a color component to be separated by said color separating means, a single photo-electric converting means for converting said color-separated image into an electric signal, a single signal processing means for forming image data by processing an output signal of said photo-electric converting means, latent image forming for forming a latent image on an image retainer based on said image data, and a plurality of developing means having therein toners each different in color for developing said latent image, wherein a step for developing said latent image on said image retainer is repeated plural times by selecting developing means corresponding to a specific color by said changeover means, so that a mono-color toner image is formed on said image retainer.

* * * * *